SAYLE SHERROW,
INVENTOR.

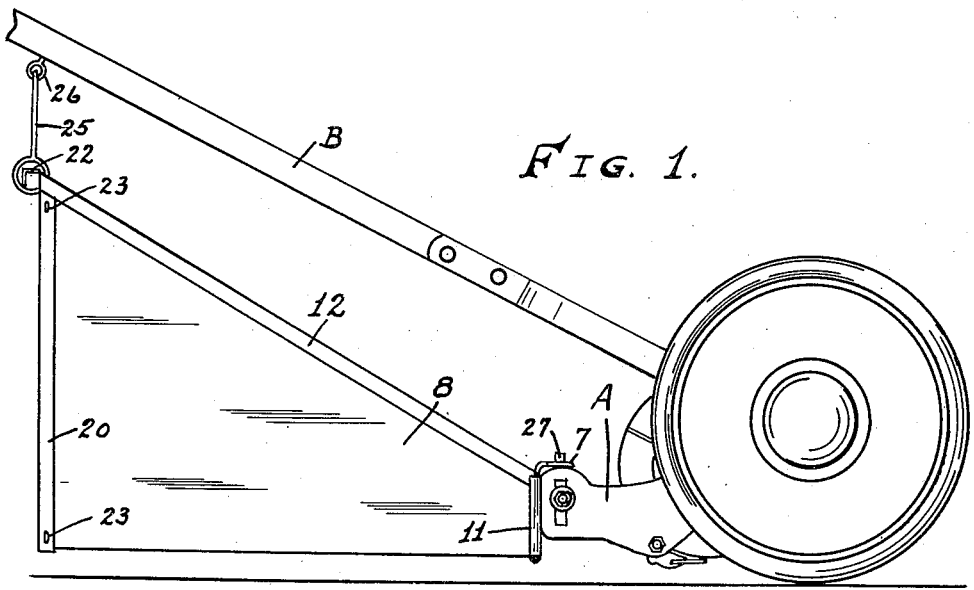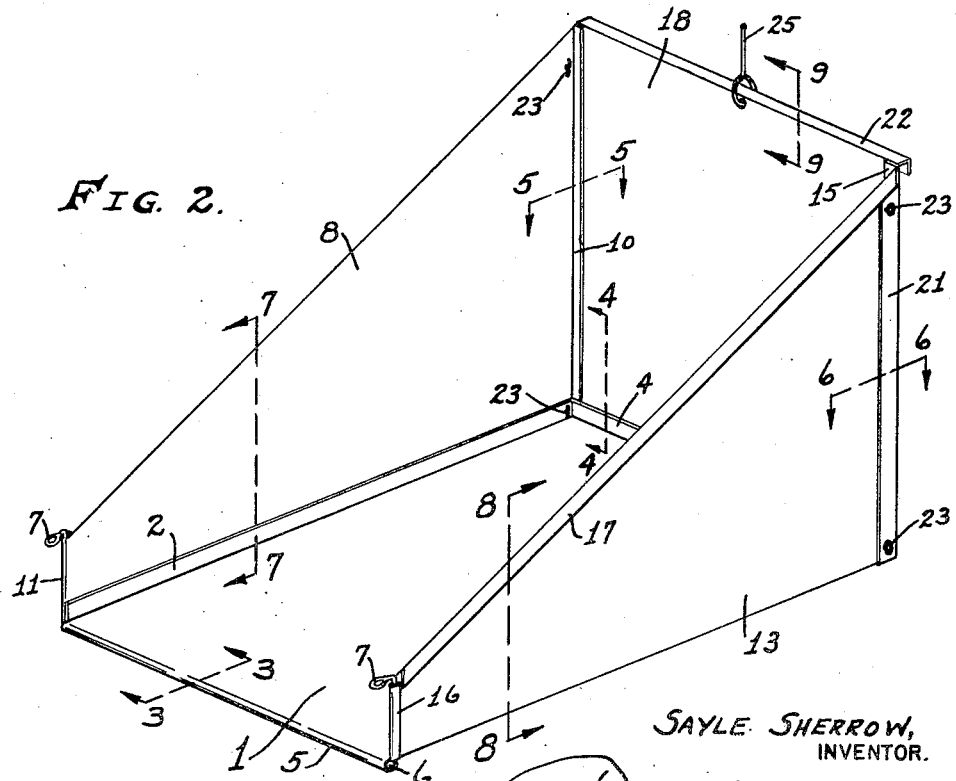

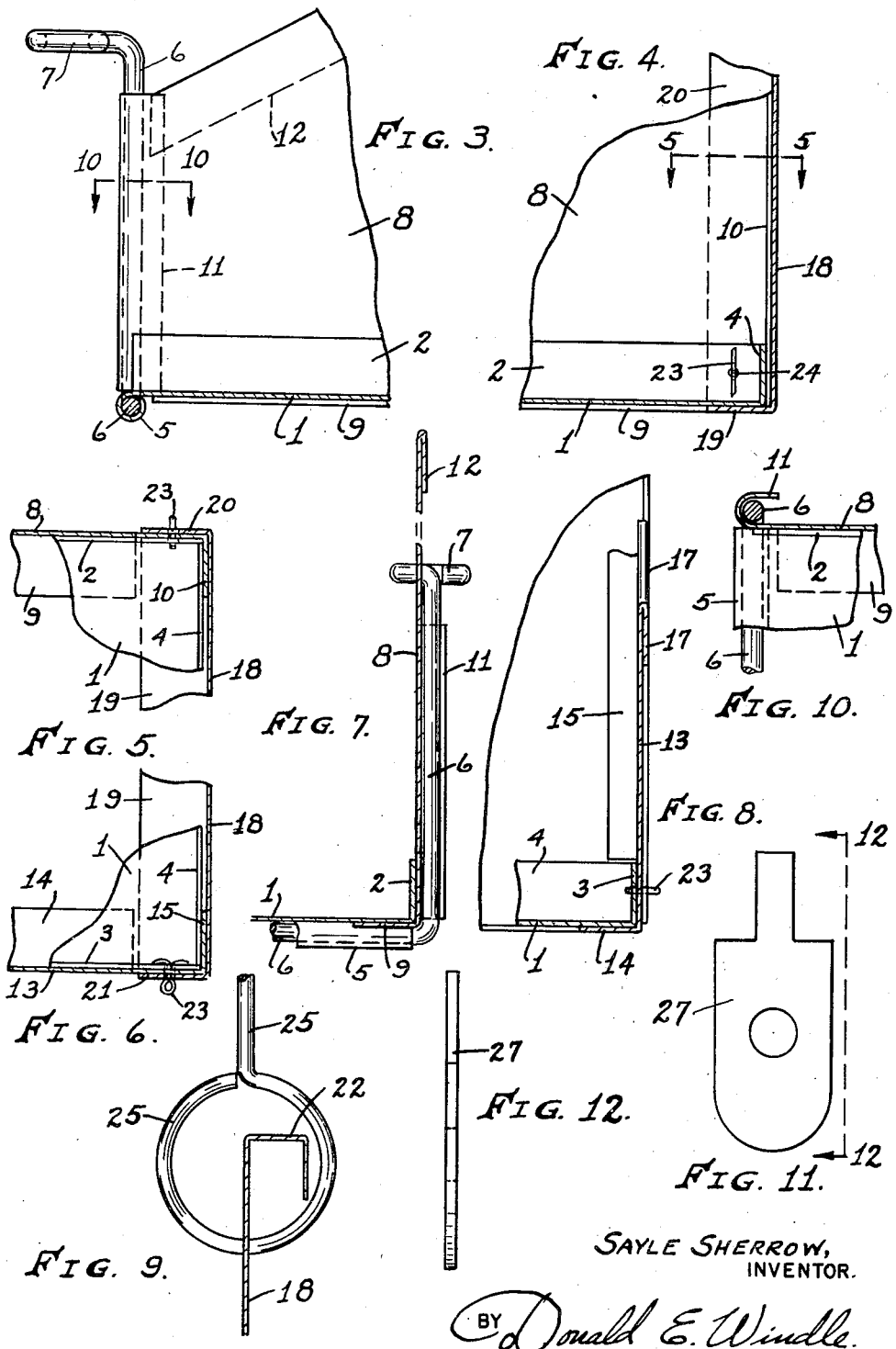

BY Donald E. Windle.
ATTORNEY.

Patented Jan. 10, 1950

2,494,062

UNITED STATES PATENT OFFICE 2,494,062

ATTACHMENT FOR LAWN MOWERS

Sayle Sherrow, Middleboro, Ind.

Application November 16, 1945, Serial No. 629,073

3 Claims. (Cl. 56—202)

My present invention relates to attachments for lawn mowers, more particularly to grass catchers. I am aware that such attachments in themselves, are old in the art.

The principal object of the present invention is to provide a grass catching receptacle which is strong and durable in construction, and which is readily attached to and detached from a lawn mower.

Another object is the provision of a grass catching device, the manufacture of which is readily adaptable to high production methods.

A third object is the adaptability of the construction for shipping and storage purposes, with the same requiring but a minimum of space.

A fourth object is the provision of a number of parts comprising the device which are simple of design and construction, and easy of assembly.

Other objects and particular advantages of the invention will be made apparent in the course of the ensuing description and also by reference to the three sheets of drawings forming a part of this specification.

The construction, the assembly, and the manner of attachment of the invention will now be set forth in detail.

Figure 1 is a right side elevation of a lawn mower with the device being attached thereto.

Figure 2 is an isometric detail view of the device.

Figure 3 is a detail section through the device, taken on line 3—3 of Figure 2, and showing the construction of the forward or leading edge of the device.

Figure 4 is a detail section through the joint formed by the back member and the bottom member, taken on line 4—4 of Figure 2.

Figures 5 and 6 are detail sections through the right and left rear corners respectively of the device, as taken on lines 5—5 and 6—6 respectively of Figure 2.

Figure 7 is a detail vertical section through the right side member, taken on line 7—7 of Figure 2, and showing the juncture of the side member with the bottom member.

Figure 8 is a detail section through the left side member and the adjacent edge of the bottom member, the same being taken on line 8—8 of Figure 2.

Figure 9 is a partial vertical section through the upper edge of the back member, taken on line 9—9 of Figure 2.

Figure 10 is a detail section through the forward edge of the right side member, the same being taken on line 10—10 of Figure 3.

Figure 11 is a detail elevational view of one of the attaching members.

Figure 12 is a detail edge view of the attaching member, taken from line 12—12 of Figure 11.

Figure 13:
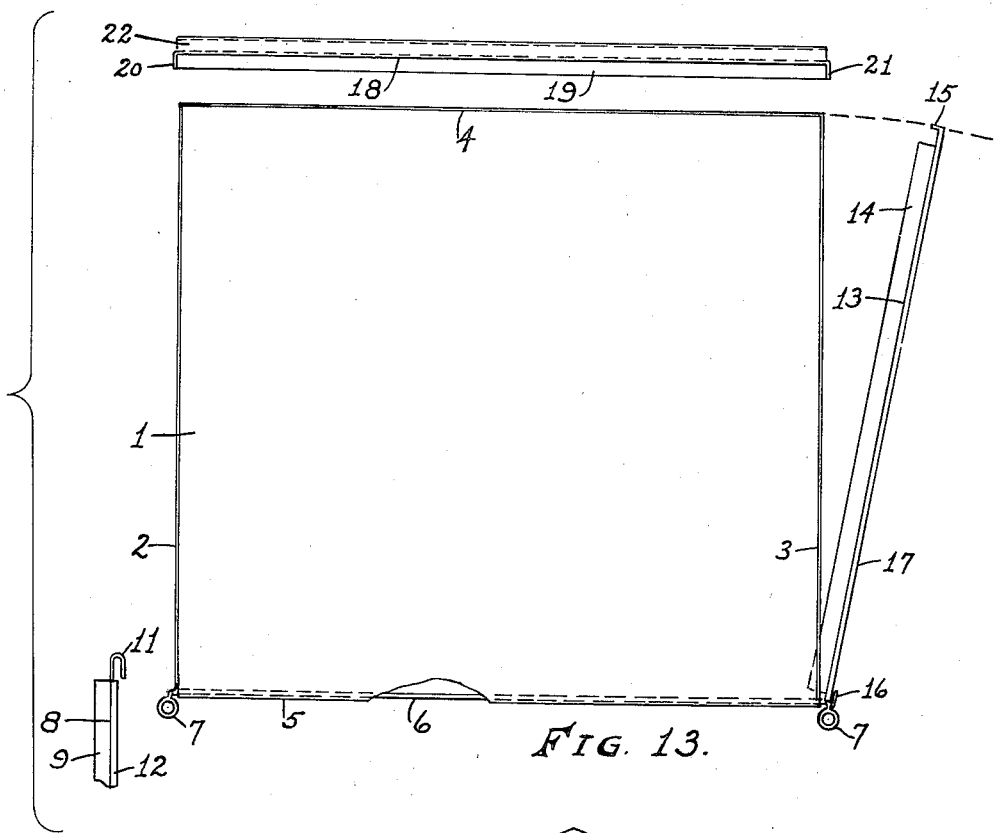

Figure 13 is a detail plan view of the device showing the manner of assembly thereof.

Figure 14:
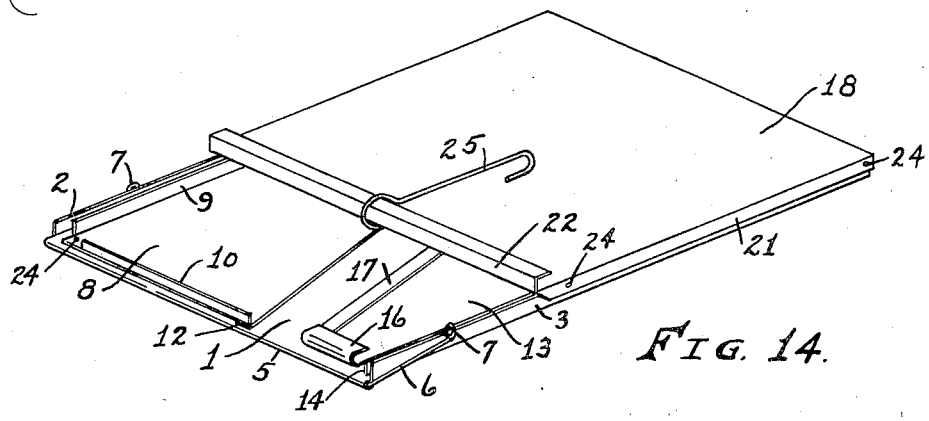

Figure 14 is an isometric view showing the parts in disassembled condition and laid together as for packing or storage.

Like characters of reference designate like parts throughout the several views.

In order that the advantages of the invention may be more fully understood, I will now take up a detailed description thereof in which the same will be more fully described in detail.

In the drawings, A designates the lawn mower, with the handle thereof being designated by letter B.

The bottom 1 of the grass catcher is preferably formed of sheet metal having the side edges and the rear edge turned upwardly and forming flanges thereby, and with the right side flange being designated as 2, the left side flange being shown as 3, and with the rear edge flange being indicated as 4. The forward or leading edge 5 of the bottom member 1 is formed to receive the rod 6 which extends upwardly from the right and left sides of the edge 5, with forwardly directed loops 7 being formed thereon.

The right side member 8 has an inwardly-turned flange member 9 formed at its lower edge. An inwardly-turned flange 10 is formed at the rear edge of the side member 8. A hook portion 11 is formed at the forward edge of side 8 with the same being adapted to hook around the adjacent upstanding portion of rod 6. The upper edge of the right side member 8 is formed by the flange 12 being folded against the outer surface of the side member and provides means strengthening the upper edge of the side member.

The left side member 13 is similar in respects to the right side member 8 except that the same is oppositely disposed with relation thereto, with a bottom inwardly-turned flange 14, a rear edge inwardly-turned flange 15, a hook 16, and the upper edge formed by the flange 17.

A back member 18 is provided with a bottom forwardly-turned flange 19, a right side forwardly-turned flange 20, a left side forwardly-turned flange 21, together with a channel-shaped upper edge 22.

The bottom, side, and back members are detachably secured together by means of cotters 23 which extend through apertures 24 formed in registering relation through the respective members.

A wire hook member 25 is secured through the back member 18 and is adapted to extend upwardly where it is removably secured into the screw eye 26, which is threaded into the lawn mower handle B, as more clearly shown in Figure 1.

The forward edge of the grass catcher is removably secured to the rearwardly-extending frame members of the lawn mower by means of the loops 7 engaging the respective members 27, one of which is removably secured to each of the frame members by means of the conventional bolts which secure the roller assembly to the frame members.

It is obvious that quantities of the respective parts can be accurately formed by the use of stamping and forming dies. The accuracy with which the parts are manufactured eliminates the necessity of assembly at the manufacturing plant and permits the shipment and storage of the parts in the form illustrated in Figure 14.

The assembly of the several parts can be accomplished by inexperienced persons. In the assembly of the device, the bottom member is laid flat on a bench or floor and with the rod 6 being swung from the position shown in Figure 14 to that shown in Figures 1, 2, 3, 7, 10, and 13. Referring now to Figure 13, the side members are hooked onto the upwardly projecting portions of the rod 6 with the rear ends of the side members being directed forwardly as indicated for the right side member 8 at the left side of Figure 13. After the hook portions 11 and 16 are hooked on the respective ends of the rod 6, the sides are swung outwardly and rearwardly until they fit against the sides of the bottom member 1. Left side member 13 is shown in Figure 13 as being in its approximate contacting position with relation to the bottom member 1. After the side members are in position with relation to the bottom 1, the back member 18 is brought forwardly with the bottom flange 19 underlying the bottom 1 and with the flanges 20 and 21 being exteriorly of the rear portions of sides 8 and 13 respectively. After the back member 18 has been brought into position with the bottom and side members, the rear portion of the assembly is secured together by means of the cotters 23 extending through the apertures 24.

It is obvious from the above that the forward ends of the side members are held in rigid relation with the bottom member by reason of the hook members engaging the upwardly-extending end portions of rod 6. It is also obvious that the cotters 23 rigidly secure the parts together at the rear portion of the device.

It will be noted further that the flange 9 of side 8, flange 14 of side 13, and flange 19 of the back member 18 underly the edges of the bottom 1 and form a comparatively tight joint therebetween.

It is readily apparent that, in order to provide devices for mowers of different widths, it is necessary to provide bottoms and back members of corresponding widths, and that the different widths will not affect the sizes of the side members.

I desire that it be understood that I am not to be limited to the exact form and construction of the parts herein shown and described, but that minor changes may be made therein insofar as the changes may fall within the scope of the appended claims.

Having now shown and described the invention, what I claim, and desire to secure by Letters Patent of the United States, is:

1. In a grass catching device, a bottom member, a rod extending across the forward edge thereof with the ends of the rod being turned upwardly, side members, a hook formed at the forward edge of each of the side members and with each of the hooks being adapted to engage a respective end of the turned-up end of the rod, and a back member removably secured through the rearward edges of the side members.

2. A grass catcher comprising a bottom member, oppositely disposed side members, and a back member, said members being detachably secured together, a rod member secured at the forward edge of the bottom member and forming attachment means for the side members thereto, with the detachment of the members one from another permitting close stacking thereof and with the rod member being foldable into close proximity with relation to the sides of the bottom member.

3. In a grass catcher device, a bottom member, a rod hingedly secured to the forward edge of the bottom member and having the extending end portions thereof turned at an angle with relation to that portion hingedly secured to the bottom member, a pair of side members, each having a hook formed at the forward edge thereof and with the hook being adapted to be removably attached to an extended portion of the rod member, an inwardly turned flange formed on the lower edge of each of the side members and adapted to underlie the side edges of the bottom member, a back member having a flange formed on the lower edge thereof with the flange being adapted to underlie the rear edge of the bottom member, a forwardly-directed flange formed at each side edge of the back member with the forwardly-directed flanges being adapted to overlie the rear edges of the respective side members, and means removably securing the members in assembled condition.

SAYLE SHERROW.

REFERENCES CITED

The following references are of record in the file of this patent:

UNITED STATES PATENTS

| Number | Name | Date |
| --- | --- | --- |
| 156,470 | Warner | Nov. 3, 1874 |
| 877,299 | Curran | Jan. 21, 1908 |
| 1,411,289 | Madigan | Apr. 4, 1922 |